Dec. 1, 1964   B. BAXTER   3,159,172
FLUID DISPENSING DEVICE
Filed May 14, 1962   2 Sheets-Sheet 1

BENJAMIN BAXTER
INVENTOR
HUEBNER & WORREL
ATTORNEYS
BY
Richard M. Worrel

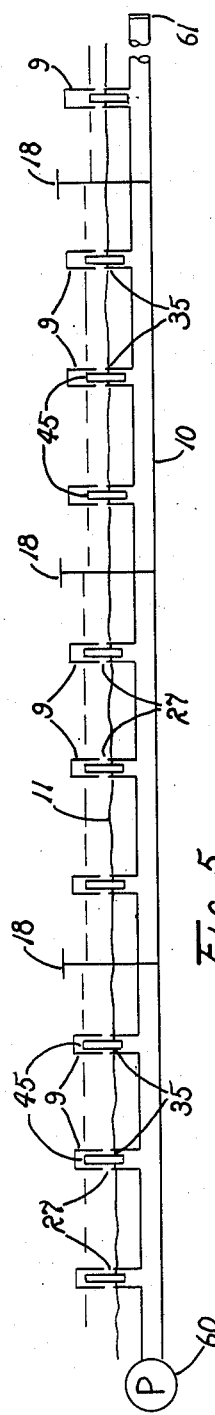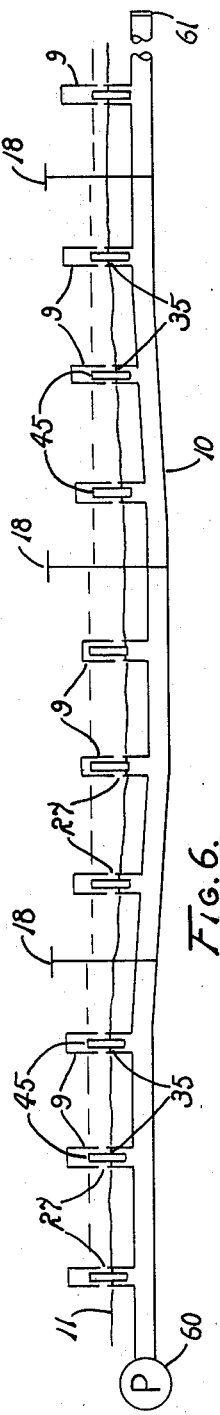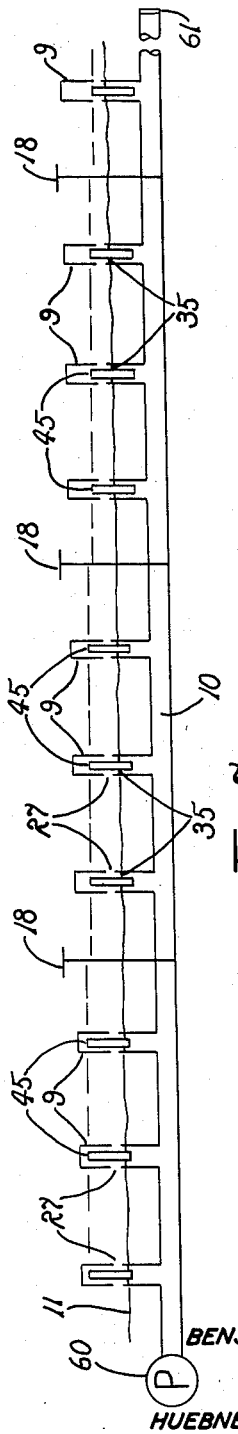

United States Patent Office 3,159,172
Patented Dec. 1, 1964

3,159,172
FLUID DISPENSING DEVICE
Benjamin Baxter, P.O. Box 488, Fowler, Calif.
Filed May 14, 1962, Ser. No. 194,317
13 Claims. (Cl. 137—236)

The present invention relates to a fluid dispensing device and more particularly to a hydrant for irrigation water distributing systems having a plurality of such dispensing devices spaced along a main supply conduit. The essence of the present invention resides in the provision of flow adjusting devices having means for regulating the distribution of water to the outlets of the respective hydrants. As will become apparent, the devices avoid the flow control problems normally encountered when such a supply conduit traverses uneven terrain and virtually eliminates line breakage incident to air pockets and pressure surges.

The instant invention can conveniently be described by first referring to conventional gravity flow irrigation systems. Generally, such systems employ main supply conduits of concrete which are laid beneath the surface of the ground. Concrete hydrants, commonly referred to as pots, are cemented to the supply conduit in predetermined spaced relation and extend upwardly from the ground. The hydrants normally provide screw-threaded valves by means of which the water discharge can be regulated or precluded. The valves are internally of the hydrants and are accessible from open upper ends thereof for adjustment purposes. Orifices are provided through the walls of the hydrant above the valve and the flow of water permitted to pass through the valve is regulated in discharge from the orifices by slidable sheet metal gates or shutters mounted for adjustable closing of the orifices. The supply conduits are frequently utilized on farms having uneven terrain. Since the orifices of the hydrants are preferably disposed at ground level to minimize erosion, where such systems are utilized on uneven land, the hydrostatic pressure of water supplied to the valves and the outlet orifices of the hydrants differs considerably and thus makes necessary individual adjustment.

Further, whether the irrigation water is supplied to the conduit by irrigation pumps or gravity flow from irrigation ditches, the volume frequently fluctuates. Since proper irrigation requires the accurate regulation of the flow rate and total quantity of water delivered to irrigation furrows or basins from the orifices, conventional irrigation systems of the character described have required almost constant attention during irrigation.

When the volume of irrigation water supplied to the conduit decreases, the more elevated of the hydrants suffer a decrease in water discharge while the lower hydrants flow at substantially the same rate. Thus, the farmer must adjust to the decreased flow by partially closing the valves of the lower hydrants in order to distribute the available water in approximately the original proportion between all of the hydrants so that all of the furrows or basins conclude their irrigation at approximately the same time. If the water supply increases, imbalance in water distribution likewise results and readjustment is required.

Still further, even though a farmer may have a relatively constant supply of irrigation water and may have his innumerable hydrants properly adjusted, they all must be opened and readjusted for each successive irrigation. When the main supply conduit is empty, as between irrigations, and a supply of irrigation water is delivered to the conduit, air is trapped in the conduit and unless the valves of the individual hydrants are opened, the sudden surge of pressure incident to the supply of irrigation water plus the buoyancy of the air trapped in the hydrants frequently causes the hydrants to break from the supply conduit. It is, therefore, the uniform practice to open all of the valves of all of the hydrants between each irrigation to avoid damage to the system. This is a time consuming and therefore expensive task.

It has been found that some of the described problems can be minimized in conduits having a relatively uniform slope by mounting the hydrants in sets with all of the hydrants in each set being surveyed to precisely the same level. In such an arrangement, gate valves are provided between the sets and parallel supply conduits utilized to deliver water independently to the sets. In such a system, the orifices of the hydrants of each set have equal hydrostatic pressure during irrigation and can accommodate variations in water supply. Thus, the gates on the orifices can be adjusted in relation to the desired proportion of water for each furrow depending upon its length and water absorption rate, and once adjusted whatever water is delivered to a set will be proportioned with sufficient accuracy. However, such systems have major disadvantages. The parallel supply conduit involves a substantial expense. The arrangement of the hydrants in each set to precisely the same elevation is tedius and expensive. In sloping or uneven terrain each hydrant must be constructed to different elevational dimensions, thus precluding utilization of a standard-length hydrant and adding to engineering costs. Further, if the terrain is uneven, many of the orifices must be excessively above ground level, in which event erosion occurs, while others are too low for effective discharge. Additionally, seldom does the farmer find that his terrain is of proper grade or slope to make such system feasible even if he can afford the costs of its installation.

An object of the present invention is, therefore, to achieve the advantages of the described system, involving parallel supply conduits and surveyed hydrant installations, without the expenses and disadvantages thereof.

Another object is to provide an irrigation system employing a plurality of hydrants which are adjustable to control the flow rate at their respective discharge orifices.

Another object is to provide an irrigation system employing a plurality of hydrants having adjustable outlet orifices in which the orifices can be regulated and the hydrants adjusted thereafter to deliver water to the orifices at substantially equal flow rates.

Another object is to provide an improved irrigation hydrant having a discharge orifice and which is adjustable to regulate the water flow deliverd to the orifice.

Another object is to provide such an adjustable hydrant which is continuously open to the atmosphere so as to preclude damages incident to air entrapment and/or pressure surges.

Another object is to provide an irrigation system that can be used on inclined, sloped, and uneven terrain and accommodate thereto so as to permit precise flow adjustment and automatic proportioning of water delivered to the system when so adjusted.

Another object is to provide an irrigation system havving a plurality of discharge hydrants disposed along a main supply conduit providing a substantially constant predetermined apportionment of all water delivered to the system to the hydrants regardless of the relative elevational position of each hydrant.

Further objects are to provide improved elements and arrangements thereof in a device of the character and for the purposes set forth.

In the drawings:

FIG. 5 is a schematic representation of an irrigation system embodying the principles of the present invention illustrating the attainment of the advantages of dual supply line or parallel piping without such duplication.

FIG. 6 is a schematic representation of an irrigation system embodying the principles of the present invention installed on uneven terrain.

FIG. 7 is such a system installed on ascending land.

Figure 1:
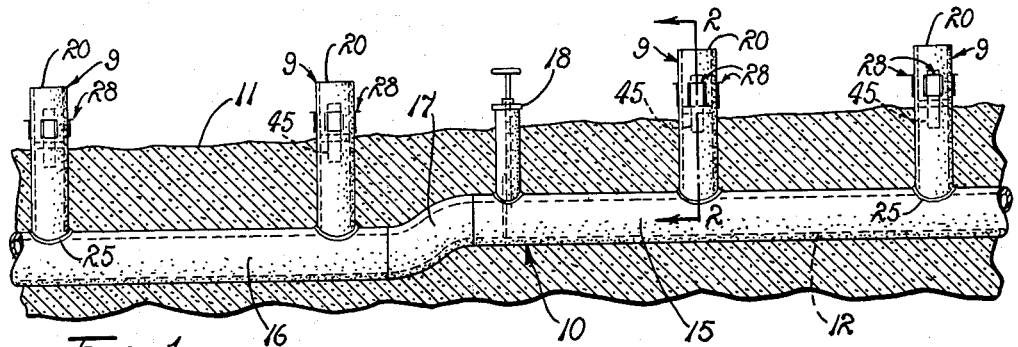
FIG. 1 is a fragmentary side elevation of a main water supply conduit of an irrigation system mounting a plurality of fluid dispensing devices of the present invention.

Referring more particularly to the drawings, the fluid dispensing device or hydrant 9 of the present invention is adapted to be mounted on a main supply conduit 10, which is best shown in FIG. 1, as disposed beneath a sloping ground surface 11. The supply conduit includes a wall 12 having a plurality of radially upwardly disposed openings 14. The supply conduit is preferably constructed of cementitious material, plastic or fibrous material, the latter being commonly known as orangeberg pipe. Such main supply line, as shown in FIG. 1, has an upper section 15 and a lower section 16 interconnected by a transition section 17 in substantially conforming relation to the sloping ground surface 11. A gate valve 18, of any suitable form, is disposed within the main supply line intermediate the upper and lower sections whereby the lower section can be isolated from the system with the supply conduit providing a flow of water under pressure from a pumping source, not shown, in a direction from right to left as viewed in FIG. 1.

Figures 2, 3, 4:
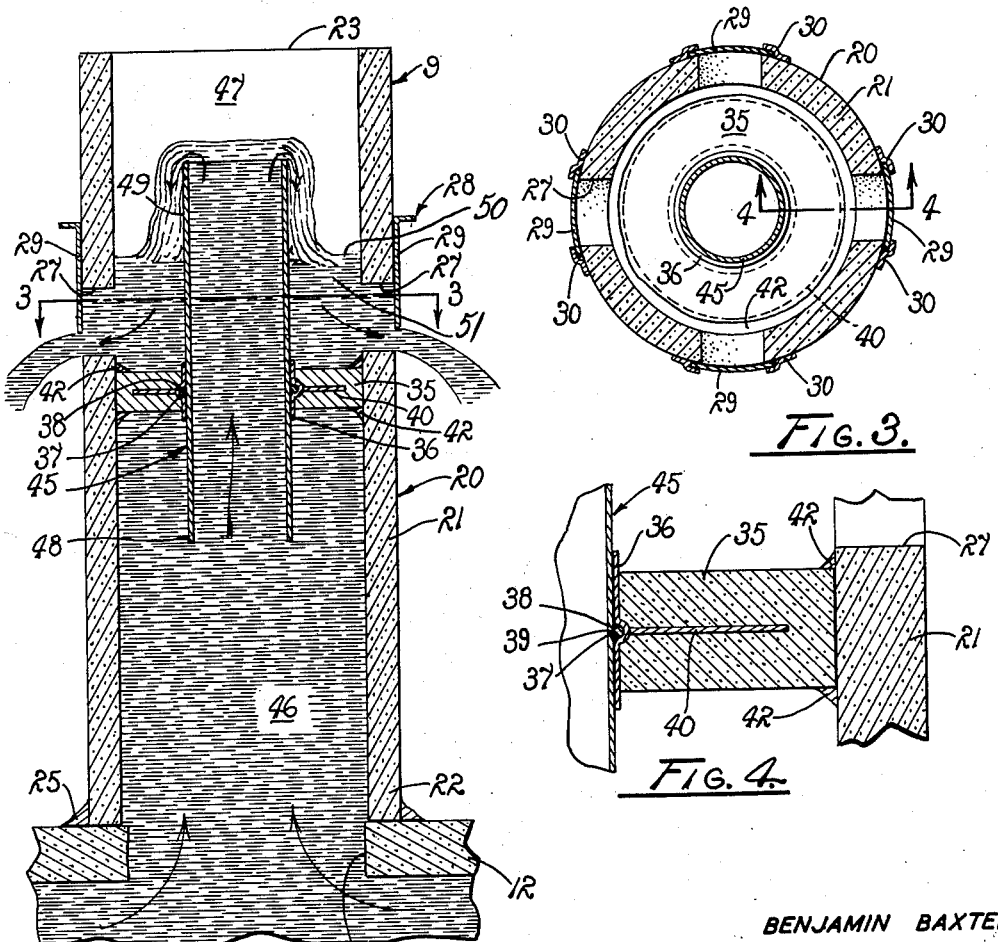
FIG. 2 is a somewhat enlarged vertical section through one of the fluid dispensing devices, taken on line 2—2 of FIG. 1.
FIG. 3 is a horizontal section through the fluid dispensing device, taken on a plane represented by the line 3—3 of FIG. 2.
FIG. 4 is a further enlarged fragmentary section, taken on line 4—4 of FIG. 3.

The hydrant 9 of the present invention provides a tubular body or riser 20 having an annular wall 21 having a lower inlet end 22 and an upwardly extended open end 23. As best shown in FIG. 2, the lower end of the wall of the riser is mounted in substantially vertically, upwardly extended relation from the supply conduit 10 in register with the opening 14 therein. Such mounting is achieved by applying a suitable binding material about the connection between the lower end of the riser and the supply conduit, as indicated at 25, such as a cement grout.

The riser 20 has a plurality of outlet orifices through the wall 21 thereof intermediate the opposite upper and lower ends of the riser. As best seen in FIG. 1, the orifices 27 are formed so as to be disposed substantially at the ground surface 11. Each of the orifices 27 is individually controlled by a gate valve 28 having a cover 29 of sheet material slidably constrained in opening and closing relation to the orifice by a frame 30 rigidly mounted on the wall 21 of the riser. Such orifices, frames, and covers are well-known in the art and permit the regulated distribution of water rising in the hydrant to circumferentially selected positions.

A wall 35 of a material similar to that of the riser 20 is disposed transversely thereof immediately below the discharge orifices 27. The wall includes a circular opening concentrically within the riser which mounts an annular guide ring 36 therein. The guide ring provides a pair of opposite annular projections which extend outwardly above and below the annular wall 35. The guide ring further includes an annular channel 37 intermediate the extensions thereof to constrain an O-ring 38 of rubber or other suitable material having an inner periphery 39 extended concentrically radially inwardly of the guide ring 36. A circular flange 40 of lightweight metallic material is secured, as by welding or the like, in circumscribing relation to the guide ring 36 intermediate the ends thereof and in radial extension from the channel 37 thereof. The flange 40 is disposed within the wall 35 to provide suitable mounting for the guide ring 36 and also to serve as a reinforcing member for the wall 35. It is noted that the wall may be either cast integrally with the riser or formed therein prior to installing the riser on the main supply conduit 10. Also the wall can be precast of a diameter snugly to fit within the riser and cemented into a position by a suitable binding material indicated at 42.

An elongated tubular sleeve 45 is extended through the guide ring 36 so that the inner periphery 39 of the O-ring 38 is disposed in circumscribing fluid-tight sealing relation thereabout. With this arrangement, the riser is divided into a lower inlet compartment 46 and an upper reservoir compartment 47. The sleeve includes a lower end 48 extended into the inlet compartment of the riser and an opposite upper discharge end 49 within the reservoir compartment of the riser. The sleeve is maintained in the desired position within the riser by frictional engagement of the O-ring 38. Such frictional engagement can, however, be easily overcome for manual positioning of the sleeve within the riser. With the sleeve thus disposed, the upper discharge end 49 thereof defines an annular orifice 50 between the sleeve and the wall 21 of the riser on a substantially horizontal plane coincident with the upper discharge end of the sleeve. Also, a fluid directing passage 51 is formed between the sleeve and the wall of the riser to provide a path of flow from the anular orifice 50 to the outlet orifices 27 in the riser.

To facilitate an understanding of the utility of the hydrant of the present invention, FIGS. 5, 6 and 7 show adaptations of the described system to various operational environments. In each of these figures, sources of water are typified by pumps 60. The supply conduits 10 are connected to the pumps for water flow from left to right, as viewed. The hydrants 9 are arranged along the supply conduits 10 in spaced relation conforming to water distribution needs. Gate valves 18 divide the hydrants into longitudinally adjacent sets. By reference to the ground surface 11, it will be noted that the system shown in FIG. 5 is installed on level land, the system of FIG. 6 on uneven terrain, and the system of FIG. 7 on an inclined slope.

In each instance, the main supply conduit 10 is extended to the end of a desired irrigation area where it is plugged at 61. The conduit is buried a distance sufficient to avoid damage by earth working equipment. The hydrants are mounted on the conduits so that the outlet orifices 27 are approximately at ground surface 11 so as to minimize erosion. No precise surveying of the hydrants to achieve a constant elevational placement is required.

In FIGS. 5, 6, and 7 the sleeves are schematically represented at 45. Independent of the ground surfaces, the sleeves of each set located between the pump and the first gate valve 18, between the gate valves, and between the last gate valve and the end 61 of the conduit are adjusted to the appropriate heights within their respective sets so as to obtain the desired apportionment of water distribution through the hydrants of that set. The levels of the sleeves in successive sets descend in units of stepped progression.

*Operation*

The operation of the described embodiment of the subject invention is believed to be clearly apparent and is briefly summarized at this point. When water is supplied to the lines 10, it flows from right to left as viewed in FIG. 1 and from left to right as viewed in FIGS. 5, 6, and 7. For initial adjustment purposes, the gate valves 18 and 28 are preferably all open. As the water flows along the conduit 10, there is a continuous venting of air to the atmosphere through the sleeves 45 so that the described entrapment and hydrant breakage is avoided. Similarly, the exhaust of the entrapped air minimizes shock incident to the surge of water.

When the conduit 10 is filled, the water rises in the hydrants and the sleeves in the lower set of hydrants are then slid upwardly or downwardly in the O-rings 38 until the upper ends of all of the sleeves of the set are at the appropriate heights to give the desired apportionment of water distribution to the hydrants of that set. It is preferable previously to have raised the sleeves of all of the preceding sets so that they are substantially above the sleeves being adjusted in the end set. This causes the water to flow out of the hydrants of the lower set and by reference to the water level in the risers 20 the sleeves can conveniently and uniformly be positioned. The gate valves 28 are then adjusted to achieve the desired discharge trajectories for the water flowing out of the orifices 27.

The gate valve 18 nearest the end of the conduit 10 is then closed and the hydrants of the adjacent set similarly adjusted so that their sleeves 45 are at the desired elevations, slightly above the elevation of the end set. The adjusting procedure is repeated set by set until all adjustments have been made. When completed, the upper ends of the sleeves of each succeeding set along the conduit are preferably at an elevation lower than the elevation of the upper ends of the sleeves of the preceding set. Two inch increments of stepped progression are satisfactory but it is not to be inferred that such 2" differential is critical. It is only mentioned as a convenient amount and quite obviously not all increments of stepped progression need be the same.

When such adjustments have been completed, the system is ready for use with an absolute minimum of attention. The irrigation can be commenced with any selected set of hydrants 9 by making certain that all of the gate valves 18 between the set and the source of water 60 are open and that the gate valve on the opposite side of the set is closed. The water then flows into the hydrants of the selected set up through the sleeves 45 thereof from whence it flows over the upper ends of the sleeves downwardly for discharge through the orifices 27. The positions of the upper discharge ends 49 of the sleeves in any one set determine the minimum-pressure heads in the supply conduit 10 necessary for water to discharge through the respective hydrants. The relative positioning of the discharge ends in any one set also establishes the flow distribution as apportioned among the hydrants of that set, by determining the amount of head available at the respective discharge ends of the sleeves. For the initial apportionment to remain effective for any one set of hydrants the system water supply must be sufficient to allow water discharge at least through the sleeve of that set having the highest elevation.

When supplying water to irrigation ditches of the same length, equal distribution is ordinarily desired and, consequently, appropriate adjustment of the sleeves will cause the sleeves of a set to be disposed at substantially equal heights. In such situations the present invention affords the advantage of effecting equal distribution of all available water, from zero to maximum flow, whether it be barely minimal or substantial in total amount.

In many instances, however, it may be necessary to supply water to ditches of unequal lengths, thus requiring the positioning of the sleeves of a set at different relative heights. The highest sleeve will be adjacent to the shortest irrigation ditch. In such situations when the total water supply is insufficient to discharge water through the highest sleeve of a set, the over-all apportionment is altered only in that the shortest ditch receives no water. However, the relative water distribution through the remaining sleeves of the set would continue as initially apportioned and, therefore, even in situations of low water supply the sleeves of the present invention provide an adjustable feature representing a distinct advantage.

When the desired flow distribution through the hydrants of the set is obtained, through manual elevational adjustment of the sleeves 45, the gate valves 28 may be adjusted to obtain the desired trajectories for the fluid discharging through the orifices 27. Lowering a valve decreases the discharge area of the orifices and tends to constrain the water within the reservoir compartment 47. This causes the water level within the compartment to rise creating a hydrostatic head at the orifices distinct from that of the main system. This head is individual to each reservoir compartment and to some extent determines the discharge velocity and trajectories of the water flowing through the orifices of that compartment. In order that the sleeves 45 may serve their intended purpose, care must be taken to see that the water level in each compartment does not rise above the upper discharge end 49 of the corresponding sleeve.

When the irrigation is completed for a given set of hydrants, the gate valves 18 are changed to direct the water to a second selected set and the irrigation procedure continued.

Between irrigations, the adjustments need not be disturbed for conduit venting purposes. Thus, many successive irrigations can be accomplished without any readjustment in contrast to the continued attention required by conventional systems if fluctuations in volume or pressure of water supply occurs.

In FIG. 5 it is evident how on level terrain, the sleeves 45 are adjusted in descending sets. As shown in FIG. 6, if the conduit 10 extends through a depressed area, the sleeves are nevertheless similarly adjustable and the system operates precisely in the same way as in level terrain. Even with ascending terrain, the sleeves are adjusted in descending levels, as shown in FIG. 7 and the operation is as described.

Thus it is readily apparent that the individual orifices 27 of each hydrant 9 can be controlled without affecting the water pressure to adjacent orifices in the same hydrant as opposed to conventional hydrants wherein the orifices are directly responsive to the pressure in the inlet end of the hydrant. Furthermore, during normal flow conditions the level of water maintained in the reservoir compartment provides a damping feature serving to minimize sudden flow variations in the fluid discharging through the orifices incident to momentary fluctuations in mainline pressure. This feature serves to minimize the erosive effect caused by intermittent gushing or spurting of the orifice discharge stream.

If the total water available in the irrigation system decreases, assuming the system pressure remains adequate to allow water discharge through the upper ends 49 of the sleeves 45 within each set, the water is nevertheless distributed to each hydrant in the same relative proportions as originally established. This results from the sleeves holding the same relative positions. The same result occurs if the volume of water increases. However, in that event, it may be necessary to raise the gate valves 28 to prevent excessive accumulation of water within the reservoir compartments 47.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A fluid dispensing device comprising an upright tubular body member having opposite inlet and open ends, a laterally disposed discharge orifice intermediate said ends sufficiently large to accommodate substantially the entire flow of fluid passing through the device with a minimum of accumulation therein, and means mounted within said body member providing an orifice supply passage communicating with the orifice and having an elevationally manually adjustable fluid discharge end open to atmospheric pressure selectively positionable intermediate the orifice and positions disposed outwardly of the open end of the body member whereby the elevation of the discharge end of said means determines the minimum fluid-supply head necessary for fluid discharge through the device and controls the fluid flow passing therethrough.

2. A fluid dispensing device comprising an upright tubular body member having opposite inlet and open ends, a discharge orifice intermediate said ends sufficiently large to accommodate substantially the entire flow of fluid passing through the device with a minimum of accumulation therein, a wall intermediate said orifice and the inlet end of the body member, and means mounted on said wall within said body member providing an orifice supply passage communicating with the orifice, said passage having an elevationally manually adjustable fluid discharge end open to atmospheric pressure selectively positionable intermediate the orifice and positons disposed outwardly of the open end of the body member.

3. A fluid dispensing device comprising an upright tubular body member having opposite inlet and open ends, and a laterally disposed discharge orifice intermediate said ends sufficiently large to accommodate all fluid flow passing through the device with a minimum of accumulation therein; a wall intermediate said orifice and said inlet end of the body member defining a reservoir adjacent to said open end thereof; and a tubular sleeve mounted elevationally manually adjustably in said wall providing an internal-external passage having fluid communiaction between said inlet end of the body member and said orifice through said reservoir.

4. A fluid dispensing device comprising an upright tubular body having opposite intake and open ends, and a discharge orifice intermediate said ends sufficiently large to accommodate all fluid flow passing through the device with a minimum of accumulation therein; a wall transversely of the tubular body intermediate the ends thereof, said wall having an opening therethrough; and a sleeve extended through said opening in the wall for axial slidable positioning therein having an inlet end in communication with said inlet end of the body, and a discharge end selectively positionable intermediate said discharge orifice and positions disposed outwardly of the open end of the body.

5. A fluid dispensing device comprising an upright tubular body having opposite intake and open ends, and a laterally disposed discharge orifice intermediate said ends sufficiently large to accommodate all fluid flow passing through the device with a minimum of accumulation therein; a wall transversely of the tubular body intermediate said intake end and the discharge orifice, said wall having a circular opening concentrically within the body; a sleeve extended through said opening in the wall for axial slidable positioning therein; and resilient means borne by the wall radially inwardly of the opening circumscribing the sleeve in substantially fluid-tight sealing relation therewith, said sleeve having an inlet end in communication with said inlet end of the body, and a discharge end selectively positionable intermediate said wall and positions disposed outwardly of the open end of the body.

6. An irrigation hydrant comprising a tubular body member having a predetermined lower end adapted for connection to a source of water under pressure and an open upper end, a wall mounted in the body member intermediate the upper and lower ends having an opening therethrough, said body member having a discharge orifice between the wall and the open end sufficiently large to accommodate all water flow passing through the device with a minimum of accumulation therein, and a sleeve mounted in the opening of the wall longitudinally of the body member for longitudinal slidable adjustment having an open lower end between the wall and the lower end of the body member and an open upper end selectively positionable between the orifice and positions disposed outwardly of the upper end of the body member.

7. A fluid dispensing device comprising an upright tubular body having opposite intake and open ends, and a discharge orifice intermediate said ends sufficiently large to accommodate all fluid flow passing through the device with a minimum of accumulation therein; a wall transversely of the tubular body intermediate said intake end and the discharge orifice, said wall having a circular opening concentrically within the body; a circular guide mounted in said opening in the wall; an elongated tubular sleeve extended through said guide in the wall for elevational manual positioning therein; and resilient friction means borne by the guide radially inwardly of the opening circumscribing the sleeve in fluid-tight sealing relation therewith, said sleeve having an inlet end in communication with said inlet end of the body, and a discharge end selectively positionable intermediate said wall and positions disposed outwardly of the open end of the body.

8. An irrigation hydrant adapted to be connected to a source of water under pressure comprising a tubular riser having opposite intake and open ends, and a plurality of discharge orifices intermediate said ends sufficiently large to accommodate all fluid flow passing through the device with a minimum of accumulation therein; a wall transversely of the riser intermediate said intake end and the discharge orifices defining a reservoir adjacent to said open end of the riser, said wall having a circular opening concentrically within the riser; a circular guide borne by the wall within said opening having oppositely extended portions projected respectively above and below said wall, said guide having an annular channel intermediate said extended portions; a resiliently compressible ring disposed in said channel having an inner periphery radially inwardly extended into the opening; and an elongated tubular sleeve extended through said resilient ring in the wall opening for elevational manual positioning therein, said resilient ring circumscribing the sleeve frictionally to maintain the sleeve in selected predetermined positions, said sleeve having an inlet end in communication with the inlet end of the riser, and a discharge end selectively positionable intermediate said wall and positions disposed outwardly of the open end of the riser defining the minimum water-supply head necessary for fluid discharge through the hydrant and controlling the water flow passing therethrough.

9. An irrigation system comprising a plurality of hydrants disposed in spaced fluid communication along a common water supply conduit and providing open upper ends all upwardly spaced a common distance from the conduit, divider means provided between said supply conduit and said upper ends of the hydrants, each of said hydrants having a plurality of discharge orifices of a size to accommodate substantially the entire flow of water through the hydrants with a minimum of accumulation therein disposed between the divider means and said open end, and flow adjusting means mounted on said divider means having an inlet end in communication with said supply conduit and a discharge end selectively positionable between said orifices and positions disposed outwardly of said open end of the hydrants so that the flow of water from the inlet to said orifices of each of the hydrants is adjustable to maintain substantially equal flow of water from the orifices throughout the system.

10. An irrigation system comprising a plurality of hydrants disposed in spaced fluid communication along a common water supply conduit and providing open upper ends all upwardly spaced a common distance from the conduit, divider means mounted between said supply conduit and said upper ends of the hydrants, each of said hydrants having a plurality of discharge orifices of a size to accommodate the entire flow of water through the hydrants with a minimum of accumulation therein disposed between the divider means and said open end, and tubular flow adjusting means slidably mounted on said divider means providing an orifice supply passage communicating with the orifices, said passage having a water receiving end, said flow adjusting means also including an inlet end in communication with said supply conduit and a discharge end selectively positionable between said orifices and positions disposed outwardly of said open end of the hydrants to direct water into its orifice supply passage in a predetermined apportioned volume of flow irrespective of elevational differences between the orifices of individual hydrants.

11. A hydrant for irrigation systems comprising a tubular riser having a lower end for connection to a water supply line and an upper open end, said riser having a discharge orifice of a size to accommodate the entire flow of water through the hydrants with a minimum of accumulation therein disposed intermediate said ends; a partition disposed transversely of the riser between said orifice and the lower end of the riser having an opening therethrough; and a tubular sleeve slidably extended through the opening in substantially fluid-tight association with the partition having an inlet end disposed beneath the partition and an outlet end above the orifice, said sleeve being elevationally adjustable to vary the rate of fluid flow to the orifice.

12. In an irrigation system having a supply conduit, the combination of a plurality of risers each having lower ends in fluid communication with the conduit and open upper ends, said risers having laterally disposed outlets of a size to accommodate the entire flow of water through the risers with a minimum of accumulation therein disposed intermediate their respective upper and lower ends; partitions disposed transversely of the risers between their respective upper and lower ends, said partitions each having an opening therethrough, and tubular sleeves slidably extended through the openings in substantially fluid-tight association with the partitions and having open inlet ends disposed below their respective partitions and open outlet ends disposed above the outlets of their respective risers, said sleeves being elevationally adjustable in their respective partitions to regulate the proportioning of water to the outlets of the respective risers in a predetermined apportioned volume of flow irrespective of elevational differences between the outlets of individual risers.

13. In an irrigation system having a supply conduit, a system for proportioning water distribution independently of fluctuations in water supply comprising a plurality of risers each having lower ends in fluid communication with the conduit and open upper ends, said risers having laterally disposed outlets intermediate their respective upper and lower ends of a size to accommodate the entire flow of water through the risers with a minimum of accumulation therein; partitions disposed transversely of the risers between their respective upper and lower ends, said partitions each having an opening therethrough, tubular sleeves slidably extended through the openings in substantially fluid-tight association with the partitions and having open inlet ends disposed below their respective partitions and open outlet ends disposed above the outlets of their respective risers, said sleeves being elevationally adjustable in their respective partitions to regulate the proportioning of water to the outlets of the respective risers in a predetermined apportioned volume of flow irrespective of elevational differences between the outlets of individual risers, and gate valves individual to the outlets adapted to regulate water flow from the outlets.

References Cited in the file of this patent
UNITED STATES PATENTS

| | | |
|---|---|---|
| 243,501 | Brown | June 28, 1881 |
| 572,842 | Towne | Dec. 8, 1896 |
| 778,323 | Martin | Dec. 27, 1904 |
| 796,590 | Martin | Aug. 8, 1905 |
| 982,080 | McCoy | Jan. 17, 1911 |
| 1,152,901 | Naylor | Sept. 7, 1915 |
| 1,249,404 | Hufferd | Dec. 11, 1917 |
| 1,457,637 | Sievers | June 5, 1923 |
| 2,618,356 | Matheis | Nov. 18, 1952 |
| 2,625,175 | Wilson | Jan. 13, 1953 |